United States Patent [19]

Suzuki

[11] Patent Number: 4,473,724
[45] Date of Patent: Sep. 25, 1984

[54] MOVABLE ELEMENT CONTROL ARRANGEMENT

[75] Inventor: Masaru Suzuki, Chiryu, Japan

[73] Assignee: Kabushiki Kaisha Tokai Rika Denki Seisakusho, Aichi, Japan

[21] Appl. No.: 403,722

[22] Filed: Jul. 30, 1982

[30] Foreign Application Priority Data

Aug. 5, 1981 [JP] Japan .............. 56-117082[U]
Aug. 5, 1981 [JP] Japan .............. 56-117083[U]

[51] Int. Cl.³ .................................. H01H 9/00
[52] U.S. Cl. .................... 200/5 R; 200/6 R; 200/52 R
[58] Field of Search ........... 200/5 R, 5 A, 6 R, 6 B, 200/6 BA, 6 BB, 6 C, 52 R, 61.54

[56] References Cited

U.S. PATENT DOCUMENTS 2,593,337  4/1952  O'Brien ............... 200/61.54 X
3,222,467 12/1965  Meyer .................. 200/6 BB X
3,254,163  5/1966  Wanlass ................ 200/6 B
3,288,947 11/1966  Wanlass et al. ......... 200/6 R
4,065,650 12/1977  Lou ..................... 200/5 A X

OTHER PUBLICATIONS

Xerox Disclosure Bulletin, Kowalski, D.C., Semi-Captive Keyboard, vol. 1, No. 2, Feb. 1976, p. 85.

Primary Examiner—J. R. Scott
Attorney, Agent, or Firm—Jackson, Jones & Price

[57] ABSTRACT

An improved arrangement for controlling one or more movable element such as seats and side windows mounted in an automobile and the like, which includes a switch holding means having switch holding faces and control switches mounted on the switch holding faces. Each control switch has an operation knob so arranged as to be operated in the directions respectively corresponding to a direction of the respective movement of the movable element. Therefore, it is very easy for a user to operate correctly the control switches without being confused at selection of switch operations.

13 Claims, 21 Drawing Figures

MOVABLE ELEMENT CONTROL ARRANGEMENT

BACKGROUND OF THE INVENTION

The present invention generally relates to a motor vehicle and the like and more particularly, to a control arrangement for controlling the motions and positions of elements such as seats, side windows and the like which are mounted on a motor vehicle and movable in more than one direction.

Conventionally, in connection with a seat mounted on a luxury automobile, there is provided a seat control arrangement for electrically controlling the positions of seats, for example, rocking motion of a seat back portion and upward-downward and forward-backward motion of a seat cushion portion. The seat control device is commonly mounted on an armrest or on a side face of a seat and has two control switches, for example a switch for controlling the seat back portion and a switch for controlling the seat cushion portion. The seat back control switch is provided with an operation knob which is rotatable in the opposite directions to move forwardly and backwardly the seat back portion. The seat cushion control switch is provided with an operation knob which is movable in the rightward, leftward, upward and downward directions to shift forwardly, backwardly, upwardly and downwardly the seat cushion portion.

However, the conventional control switch as described above has a disadvantage in that the user is apt to be confused in selecting the operations of the switch knobs since the operating directions of the knobs do not respectively correspond to or coincide with the directions of the actual movements of the seat back portion and seat cushion portion. The user commonly operates the switch knobs according to his memory representing the relationship between the operating directions of the switch knobs and the directions of actual movements of the above seat portions. Although each of the switch knobs have a mark representing the corresponding direction of movement of the above portions, the users are not generally in a position to practically see the marks.

Furthermore, with respect to side windows for another example, the recent luxury automobiles are provided with a window control arrangement which electrically controls opening and closing of side windows, for example, upward and downward movements of the side windows. According to one example of such window control arrangement shown in FIG. 1, the arrangement comprises four control switches 111, 112, 113 and 114 disposed on a switch holding portion formed, for example, an upper horizontal face of an armrest 110 for a driver. The switches 111, 112, 113 and 114 control in turn, for example, a right-forward window, a left-forward window, a right-rear window and a left-rear window. Each of the switches 111, 112, 113 and 114 has an operation knob 111a, 112a, 113a or 114a of a toggle type which is operated in such a manner that when each knob is turned outwardly, the corresponding window moves upwardly to be closed. When each knob is turned inwardly, the corresponding window moves downwardly to be opened.

However, the switches of the known window control arrangement as described above also have the same disadvantage as that of the seat control switches described earlier. In other words, the user is apt to be confused during selection of switch operations and improperly operate the switch knobs 111a, 112a, 113a and 114a since the operating directions of the knobs do not correspond to the directions of the window movements. Additionally, there is a problem in that the user is apt to be confused during selection of the switch knobs to be operated since the switches 111, 112, 113 and 114 are aligned in series and their arrangement does not correspond to the real arrangement of the four side windows.

SUMMARY OF THE INVENTION

Accordingly, an essential object of the present invention is to provide an improved movable element control arrangement for controlling movements of movable elements such as seats and side windows mounted on a motor vehicle. These movements are readily and correctly operable even when the user does not exactly memorize the relationship between the operating directions of the switch knobs provided on the control arrangement and the directions of the movements of the movable element to be moved, for example, the desired operation is easily and correctly understood only by the observation of the switches or by touching the switches.

In accomplishing this and other objects, according to the present invention, there is provided a movable element control arrangement for use in a motor vehicle such as an automobile and the like, which comprises a switch holding means having a plurality of switch holding faces and at least one control switch having an operation knob so arranged as to be operated in the specific directions which respectively corresponds to the direction of the respect movement of the element.

According to one preferred embodiment of the present invention, there is provided a seat control arrangement which comprises a switch holding means having a simple protrusion model or a simple recess model which is similar to the side shape of the seat consisting of a seat back portion and a seat cushion portion and, a plurality of switches mounted on the side faces of the model and/or a portion adjacent to the side faces of the model, the respective switches having a switch knob arranged to be operated in the directions corresponding to the directions of the desired motion of the seat back portion and the seat cushion portion.

According to another preferred embodiment of the present invention, there is provided a window control arrangement which comprises a switch holding means having a simple protrusion model or a simple recess model which is similar to the top plan shape of the motor vehicle and a plurality of switches so arranged on the side faces of the model as to correspond to the arrangement of the side windows, the respective switches having a switch knob arranged to be operated in the directions corresponding to the directions of the desired motion of the windows.

BRIEF DESCRIPTION OF THE DRAWINGS

This and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Referring to FIGS. 2A, 2B, 2C and 2D respectively illustrating a seat control arrangement according to one preferred embodiment of the present invention, the seat control device has a switch holding portion formed on an armrest installed on the inner face of a door such as adjacent to a seat to be controlled, the side face of the seat cushion portion of the seat, the dashboard, the console box or the like. The switch holding portion comprises a flat face A forming the top plan face of the armrest and protrusion portions 1 and 2 respectively protruding from the flat face A. The protrusion portions 1 and 2 are configured to form small and simple models of a seat back portion and seat cushion portion of the actual seat. In other words, one protrusion portion 1 has a shape similar to the side shape of the seat back portion, while the other protrusion portion 2 has a shape similar to the side shape of the seat cushion portion. The switch holding portion or base member can be formed integrally with the armrest or the like by synthetic resin.

Figure 2A:
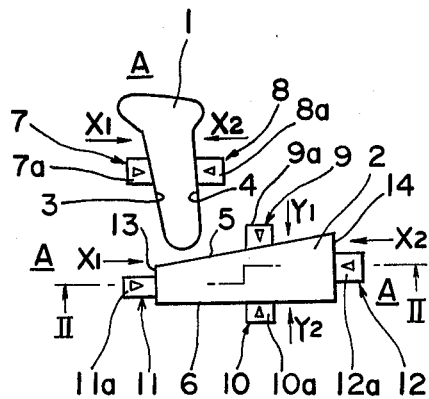
FIG. 2B is a sectional view of the arrangement taken along a line II—II in FIG. 2A, FIGS. 2C and 2D are respectively sectional views of arrangements similar to FIG. 2B, according to modifications of FIGS. 2A and 2B.
Figure 2B:
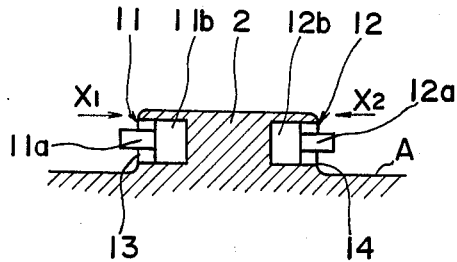

Referring to FIGS. 2A and 2B, the seat back model 1 is provided with switches 7 and 8 at the opposed outer side faces 3 and 4, while the seat cushion model 2 is provided with switches 9, 10, 11 and 12 at outer upper and bottom faces 5 and 6 and the opposed side faces 13 and 14. These switches are respectively of a type of a momentary push button switch with the operation knobs 7a, 8a, 9a, 10a, 11a and 12a respectively designed so as to automatically return to the initial position as shown in FIGS. 2A and 2B when the pushing pressure is released.

The bodies of the switches 7 to 11 are respectively embedded in recesses formed on the corresponding faces 3 to 6, 13 and 14. FIG. 2B shows only bodies 11b and 12b of the switches 11 and 12. The operation knob of each pair of switches 7a and 8a; 9a and 10a; 11a and 12a are so designed to be pushed in the opposed directions indicated by arrows X1, X2, Y1 and Y2. In other words, the respective knobs 7a to 12a are pushed against the corresponding side faces 3 to 6, 13 and 14. For the purpose of facilitating the operation of the switch knobs, the knobs are respectively printed with marks representing the operating directions.

The operating directions X1, X2, Y1 and Y2 for pushing the respective switch knobs 7a to 12a with respect to the protrusion portions 1 and 2 as seat model, coincide with the directions of the desired movement of the seat back portion and seat cushion portion. When the switch knob 7a is pushed in the direction X1, the electric circuit for driving a motor (not shown) is closed so that the seat back portion rocks forwardly. When the switch knob 8a is pushed in the direction X2, the seat back portion rocks backwardly. When the switch knob 9a is pushed in the direction Y1, the seat cushion portion shifts downwardly, while the switch knob 10a is pushed in the direction Y2, the seat cushion portion shifts upwardly. When the switch knob 11a is pushed in the direction X1, the seat cushion portion shifts forwardly, while the switch knob 12a is pushed in the direction X2, the seat cushion portion shifts backwardly. As described above, since the respective switch knobs 7a to 12a are of a momentary push button type, when the pushing pressure against the switch knob is released, the switch knob automatically returns to the initial position shown in FIGS. 2A and 2B to open the electric circuit to stop the shift of the seat back portion and seat cushion portion.

Figure 2C:
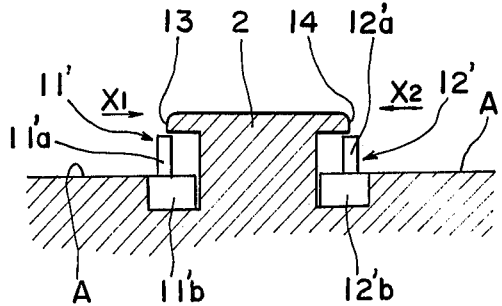
Figure 2D:
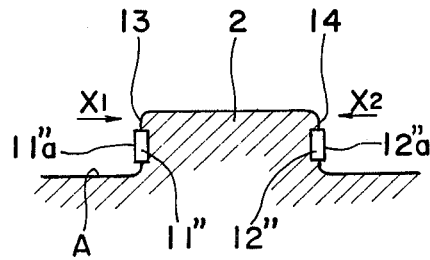

Although the push button switches are described as employed in the embodiment as described above, the switches can be replaced by a momentary slide switches shown in FIG. 2C and a pressure sensitive switches shown in FIG. 2D.

Referring to FIG. 2C, a switch body 11'b of a slide switch 11' is embedded in a recess formed on the side face 13 of the seat cushion model 2 and the flat face, while a switch body 12'b of a slide switch 12' is embedded in a recess formed on the side face 14 and the flat face A. The slide switches 11' and 12' respectively have slide knobs 11'a and 12'a respectively arranged to be pushed in the directions X1 and X2 from the initial position shown in FIG. 2C. When the pushing pressure against the switch knobs 11'a and 12'a is released, the switch knob automatically returns to the initial position. Although FIG. 2C shows only the switches 11' and 12' for shifting forwardly and backwardly the seat cushion portion, the other switches 7, 8, 9 and 10 are replaced by the same momentary slide switches as the switches 11' and 12'.

Further, the switches 7 to 12 can be respectively replaced by pressure sensitive switches as shown in FIG. 2D. FIG. 2D illustrates, as an example, the pressure sensitive switches 11″ and 12″ for shifting forwardly and backwardly the seat cushion portion 2. The switch 11″ is embedded in a recess formed on the side face 13 of the seat cushion model 2, while the switch 12″ is embedded in a recess formed on the other side face 14. The switches respectively have pressure sensitive surfaces 11″a and 12″a respectively arranged to be touched or pushed in the directions X1 and X2.

FIGS. 3A, 3B, 3C and 3D illustrate the other seat control arrangement according to a second embodiment of the present invention, in which the switch holding portion is formed by two recess portions 1' and 2'. One recess portion 1' is a small and simple seat back model similar to the side shape of the seat back portion, while the other recess portion 2' is a small and simple seat cushion model similar to the side shape of the seat cushion portion. In this embodiment, each control switch is mounted on the inner side faces of the models 1' and 2'.

Figure 3A:
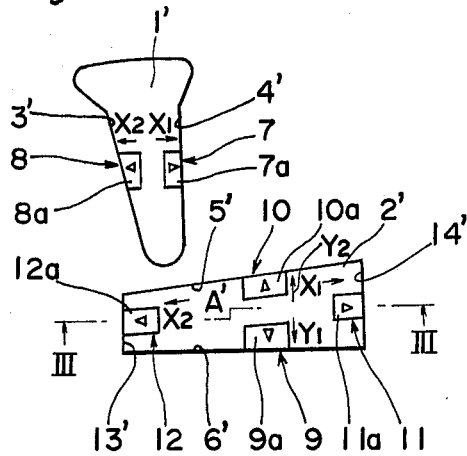
FIG. 3A is a front elevational view of seat control arrangement according to another embodiment of the present invention.
Figure 3B:
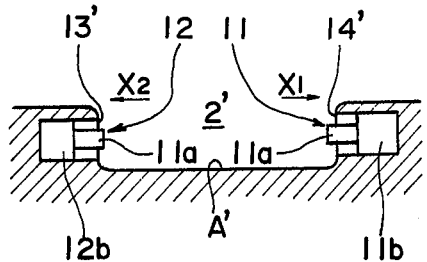
FIG. 3B is a sectional view of the arrangement taken along a line III—III in FIG. 3A, FIGS. 3C and 3D are respectively sectional views of arrangements, similar to FIG. 3B, according to modifications of FIGS. 3A and 3B.

Referring to FIGS. 3A and 3B, momentary push button switches 8 and 7 are respectively mounted on the side faces 3' and 4' of the seat back model 1' corresponding respectively to the side faces 3 and 4 in the first embodiment. Therefore, when the knob 7a of the switch 7 is pushed in the direction X1, the seat back portion rocks forwardly. When the knob 8a of the switch 8 is pushed in the direction X2, the seat back portion rocks backwardly. Likewise, the switches 9, 10, 11 and 12 are respectively mounted on the corresponding inner side faces of the seat cushion model 2'. The pair of switches 9 and 10 are respectively so arranged to shift downwardly and upwardly the seat cushion portion, while the other pair of switches 11 and 12 are respectively so arranged to shift forwardly and backwardly. The bodies of the switches 7 to 12 are respectively embedded in the recesses formed on the corresponding inner side faces 4', 3', 6', 5', 14' and 13' in the same manner as the first embodiment.

Figure 3C:
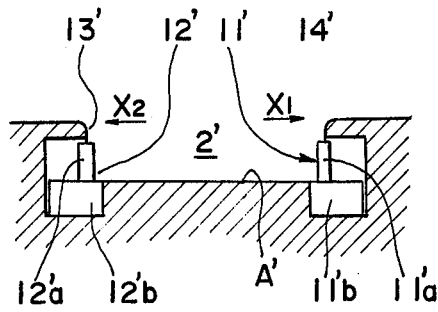
Figure 3D:
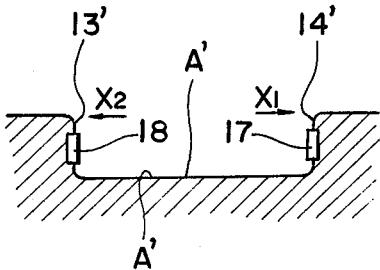

In the second embodiment, the momentary push button switches 7 to 12 can be respectively replaced by the momentary slide switches shown in FIG. 3C and the pressure sensitive switches in FIG. 3D. The bodies of the slide switches are respectively embedded in the recesses formed in the side faces and the inner flat face A'.

The second embodiment as described above has a specific advantage that some articles, for example, clothes of the user, can be prevented from engaging the switch knobs, since these switch knobs are accommodated in the recess portions 1' and 2'.

As is clear from the foregoing description, the seat control arrangement according to the present invention comprises a small and simple seat model including protrusion portions or recess portions similar to the seat back portion and seat cushion portion of an actual seat. A plurality of control switches have operation knobs with operating directions coinciding with desired movements of the seat back portion and the seat cushion portion. It is even possible for children to readily recognize by observation or touching, what element, for example, seat back portion or seat cushion portion is to be operated and in what direction each switch knob is to be actuated.

Furthermore, the above seat control arrangement has such an advantage that as the seat model is stationary per se and does not have functions for operation levers or the like for operating the switches, rigidity is not necessarily required for the seat model, and therefore, soft material may be employed, thus allowing a fairly free selection of materials for the seat model.

Furthermore, the window control device according to the present invention will become apparent from the following description taken in conjunction with the preferred embodiments thereof with reference to FIGS. 4A, 4B, 4C, 4D, 5A, 5B.

Referring to FIGS. 4A to 4D respectively illustrating a window control arrangement according to a further embodiment of the present invention, the window control arrangement has a switch holding portion mounted, for example, on an armrest 51 which is installed on the inner face of a door E in a driver's cab. The arrangement may be mounted on other portions such as a dashboard, console box or the like. The switch holding portion comprises a protrusion portion 52 which is integrally made with the armrest 51 and forms a small and simple model of an automobile, the side windows of which should be controlled. The switch holding portion of a rectangular prism configuration has a pair of opposed side faces 52a and 52b which are respectively arranged vertically and in parallel with respect to the an arrow Z representing the advancing direction of the automobile.

Figure 4A:
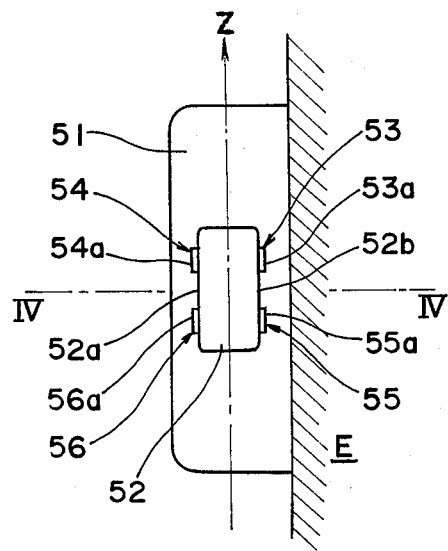
FIG. 4A is a top plan view of an armrest mounted on an automobile with a window control arrangement according to another embodiment of the present invention.
Figure 4B:
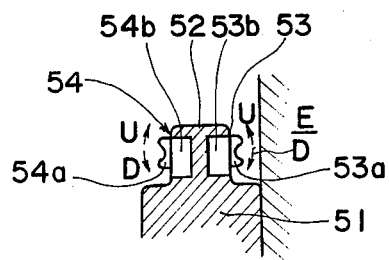
FIG. 4B is a sectional view of the arrangement taken along a line IV—IV in FIG. 4A, FIGS. 4C and 4D are respectively sectional views of arrangements, similar to FIG. 4B, according to modifications of FIGS. 4A and 4B.

Referring to FIGS. 4A and 4B, the window model 52 is provided with switches 53, 54, 55 and 56 at the opposed side faces 52a and 52b. The arrangement of these switches 53, 54, 55 and 56 corresponds to the arrangement of four side windows including a pair of forward windows and a pair of rear side windows. In other words, the switch 53 is arranged at the right forward position of the model 52 corresponding to the right forward side window so as to operate the window per se, while the switch 54 is arranged at the left forward position of the model 52 corresponding to the left forward side window so as to operate the window per se and further the switch 55 is arranged at the right rear position of the model 52 corresponding to the right rear side window so as to operate the window per se, while the switch 56 is arranged at the left rear position of the model 52 corresponding to the left rear side window so as to operate the window per se.

The respective switches 53 to 56 are of a toggle type and have operating knobs 53a, 54a, 55a and 56a which turn upwardly and downwardly. The switch bodies 53b, 54b and so forth are embedded in recesses mounted on the side face 52b and 52a as shown in FIG. 4B. For the purpose of adapting the operation of the switch knob 53a to 56a to user's psychology, these switch knobs 53a to 56a are respectively arranged such that when the switch knobs are turned up in the direction U from the middle position shown in FIG. 4B, the windows move upwardly so as to be closed. When the switch knobs are turned down in the direction D from the middle position, the windows move downwardly so as to be opened. In other words, the operating directions of the switch knobs coincide with the directions of the desired movements of the windows.

Figure 4C:
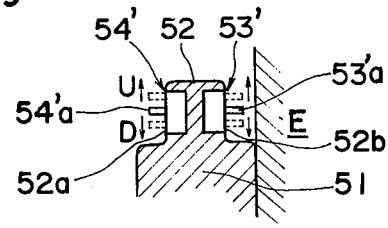
Figure 4D:
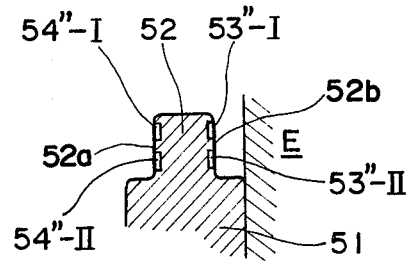
Figure 7:
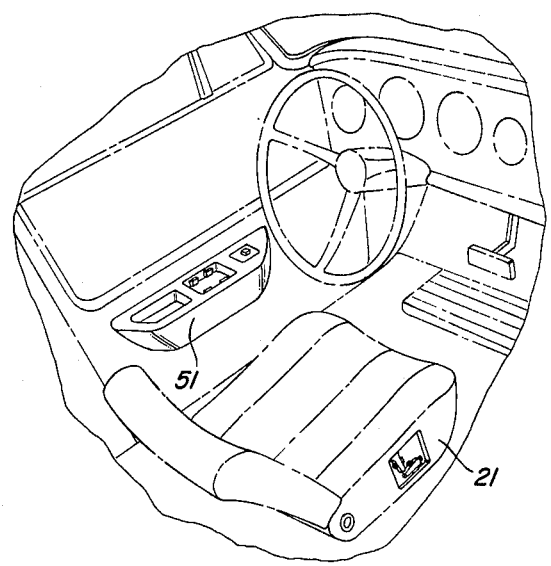
FIG. 7 is a perspective view of an interior of a car.

The switches 53 to 56 can be respectively replaced by slide switches as shown in FIG. 4C or pressure sensitive switches shown in FIG. 4D.

Referring to FIG. 4C, a slide switch 53' corresponding to the toggle switch 53 in FIG. 4A is embedded in a recess formed in the side face 52b, while a slide switch 54' corresponding to the toggle switch 54 in FIG. 4A is embedded in a recess formed in the side face 52a. The slide switches 53' and 54' respectively have slide knobs 53'a and 54'a which are respectively arranged to be pulled in the direction U from the middle position shown by the solid line to respectively shift upwardly the right forward window and the left forward window and to be pushed in the direction D from the middle position to respectively shift downwardly the windows. Although not shown in the drawings, the switches for operating a pair of rear side windows may be replaced by the same slide switches as the switches 53' and 54'.

Referring further to FIG. 4D, a pair of pressure sensitive switches 53"-I and 53"-II are embedded in the respective recess formed in the side face 52b, while a pair of pressure sensitive switches 54"-I and 54"-II are embedded in the respective recess formed in the side face 52a. The respective switches 53"-I and 54"-I are arranged to be touched or pushed to shift upwardly the right and forward windows, while the respective switches 53"-II and 54"-II are arranged to be touched or pushed to shift downwardly the windows. Although not shown in the drawings, the switches for operating a pair of rear side windows may be replaced by the same pressure sensitive switches as the switches 53"-I, 53"-II ad 54"-I, 54"-II.

Figure 5A:
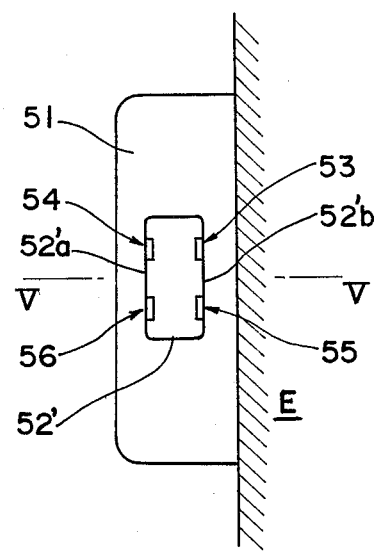
FIG. 5A is a top plan view of an armrest mounted on an automobile with a window control arrangement according to a further embodiment of the present invention.
Figure 5B:
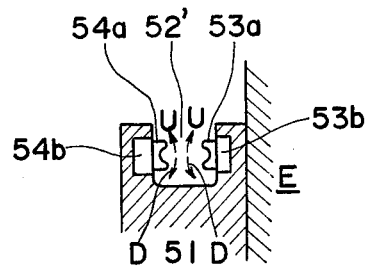
FIG. 5B is a sectional view of the arrangement taken along a line V—V.

FIGS. 5A and 5B illustrate another window control arrangement according to the present invention, in which the switch holding portion is formed by a recess portion 52'. The recess portion 52' is a small and simple model of the automobile and the respective side face 52'b and 52'a have toggle switches 53, 55 and 54, 56 which respectively correspond to the side windows in the similar manner as in the first embodiment. Needless to say, the toggle switches 53 to 56 are replaced by the same slide switches as shown in FIG. 4C and the same pressure sensitive switches as shown in FIG. 4D.

The window control arrangements according to the respective embodiments have such advantages since the arrangement of the control switches are juxtapositioned on the base member and exactly correspond to the arrangement of the four side windows of the automobile and additionally, the operating directions of the switch knobs coincide with the directions of the desired motion of the side windows, it is extremely easy for the user to recognize the relationship between the operating switch knobs and the windows to be operated, with the result that the user can always operate the switch knobs correctly.

Figure 1:
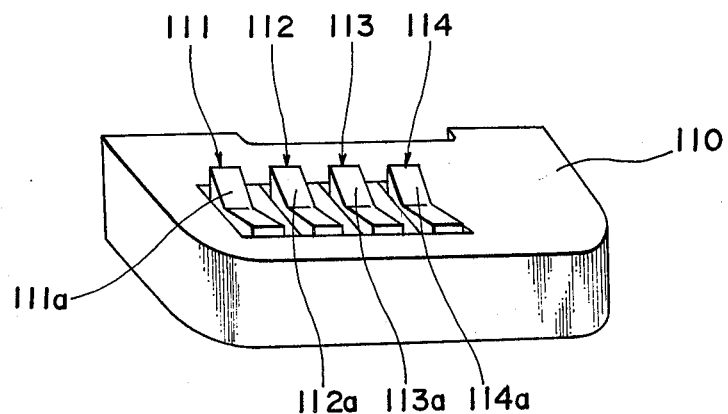
FIG. 1 is a perspective view of a armrest mounted on an automobile, with a conventional window control arrangement, which is already referred to, FIG. 2A is a front elevational view of a seat control arrangement according to one preferred embodiment of the present invention.
Figure 6:
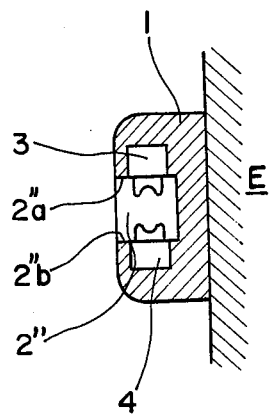
FIG. 6 is a sectional view of an arrangement according to a modification of FIGS. 5A and 5B.

Additionally, the recess portion may be modified in such manner as shown in FIG. 6. Referring to FIG. 6, the recess portion 2" is formed in the side face of the armrest 1 of the automobile. The switches 3, 4 and so forth are embedded in the recesses formed in the inner upper face 2"a and inner bottom face 2"b. Therefore, this switch holding portion is arranged so as to be perpendicular with respect to the switch holding portion in FIG. 5A. In other words, the position of arrangement of the switches is different from that of the arrangement of the windows by 90°. In this embodiment, the user must operate the switches by taking the relationship between the switches and the windows into consideration.

Figure 8:
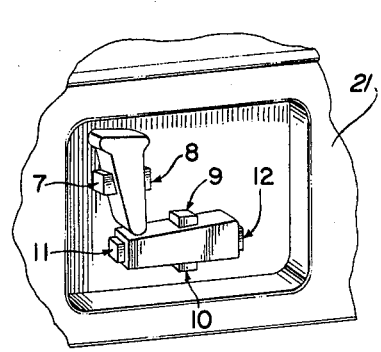
FIG. 8 is a perspective view of FIG. 2A.
Figure 9:
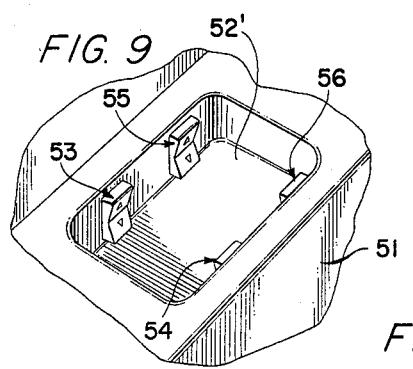
FIG. 9 is a perspective view of FIG. 5A.
Figure 10:
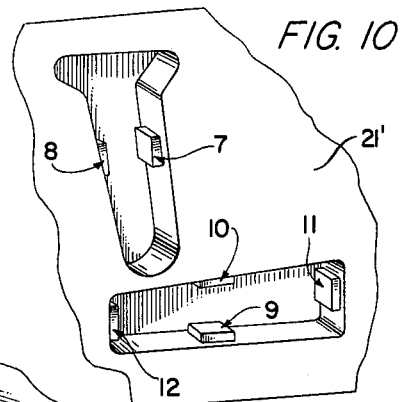
FIG. 10 is a perspective view of FIG. 3A.
Figure 11:
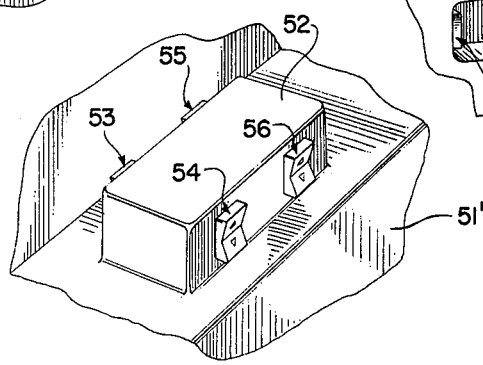
FIG. 11 is a perspective view of FIG. 4A.

FIGS. 7 through 11 provide a three-dimensional view of the arrangement of the switch arrays as positioned on an armrest 51 or on the side of a seat member 21. FIG. 8, for example, is a three-dimensional view of the embodiment of FIG. 2A, while FIG. 9 is a three-dimensional view of the embodiment of FIG. 5A, FIG. 10 is a three-dimensional view of the embodiment of FIG. 3A, and FIG. 11 is a three-dimensional view of the embodiment of FIG. 4A.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A switch arrangement for application in a motor vehicle having a motorized adjustable seat with a movable cushion portion and a back rest portion that permits an automatic adjustment to a subjective position desired by the operator, comprising:

a base member configured to simulate the exterior configuration of the seat on a reduced scale having a substantially L shape with an elongated four-sided cushion portion having a horizontal portion with an upper and lower surface and also a forward and rearward side surface and an upper back portion with a front and back surface, the back portion positioned adjacent one end of the cushion portion and extending in one vertical direction substantially traverse to the elongated horizontal portion, and switch means respectively positioned on the base member for driving the motorized seat, the switch means being juxtapositioned on the base member so that both the position and direction of activation of the switch means simulates a manual movement of the actual seat positions to the desired positions for the operator, including a first switch on one of the upper surface and lower surface for controlling movement of the seat downwardly;

a second switch on the other of the upper surface and the lower surface for controlling movement of the seat upwardly;

a third switch on one of the forward surface and rear surface for controlling movement of the seat rearwardly;

a fourth switch on the other of the forward surface and the rear surface for controlling movement of the seat forwardly;

a fifth switch on one of the front surface and back surface for controlling movement of the seat back backwardly; and a sixth switch on the other of the front surface and the back surface for controlling movement of the seat back frontwardly.

2. The invention of claim 1 wherein the base member is formed of a resilient material.

3. The invention of claim 1 wherein the base member is recessed within a support structure that surrounds the base member and switches.

4. The invention of claim 1 wherein the base member is connected to and extends above a support structure.

5. A switch arrangement for application in a motor vehicle having motorized adjustable windows that permit automatic adjustment to subjective positions desired by the operator, comprising:

a base member configured to approximately simulate the exterior configuration of an automobile exterior on a reduced scale having a raised surface and a lowered surface forming a plurality of side walls with the side walls corresponding to the sides of a motor vehicle with two opposing side walls corresponding respectively to the left and right sides of the vehicle, the base member capable of mounting in a motor vehicle to be spatially aligned therewith, and switch means respectively positioned on the base member for driving the motorized windows, the switch means being juxtapositioned on the base member so that both the position and direction of activation of the switch means simulates a manual movement of the actual window positions to the desired positions for the operator, including a first switch mounted on the first opposing side wall for controlling the movement of the front left vehicle window;

a second switch mounted on the first opposing side wall rearward of the first switch for controlling the movement of the rear left vehicle window;

a third switch mounted on the second opposing side wall for controlling the movement of the front right vehicle window; and a fourth switch mounted on the second opposing side wall for controlling the movement of the rear right vehicle window.

6. A switch mounting structure for use in a vehicle wherein the location of the vehicle component to be operated by a particular switch on the switch mounting structure can be indicated by the spatial positioning of the switch on the switch mounting structure, comprising:

a switch holding structure mounted on the vehicle and having a raised surface and a lowered surface forming a plurality of side walls with the side walls corresponding to movable vehicle component locations, or oriented to form a miniaturization of a vehicle component having movable portions, and spatially aligned therewith; and a plurality of switches mounted on the side walls and located in spatial relation to each other in positions corresponding to the relative location in the vehicle of a movable vehicle component operated by the switch, or to the relative position of the movable portion of the vehicle component with respect to the other switches on the switch mounting.

7. The apparatus of claim 6 further comprising:

the side walls are formed in the shape of the cross-section of a seat having a horizontal portion with an upper and lower surface and a forward and rear surface and a vertical portion with a front and back surface;

a first switch on one of the upper surface and lower surface for controlling movement of the seat downwardly;

a second switch on the other of the upper surface and the lower surface for controlling movement of the seat upwardly;

a third switch on one of the forward surface and rear surface for controlling movement of the seat rearwardly;

a fourth switch on the other of the foward surface and the rear surface for controlling movement of the seat forwardly;

a fifth switch on one of the front surface and back surface for controlling movement of the seat back backwardly; and a sixth switch on the other of the front surface and the back surface for controlling movement of the seat back frontwardly.

8. The apparatus of claim 6 further comprising:

the side walls are formed in a shape generally of a plan view of the vehicle and having two opposing side walls corresponding respectively to the left and right sides of the vehicle and generally aligned therewith;

a first switch mounted on the first opposing side wall for controlling the movement of the front left vehicle window;

a second switch mounted on the first opposing side wall rearward of the first switch for controlling the movement of the rear left vehicle window;

a third switch mounted on the second opposing side wall for controlling the movement of the front right vehicle window; and a fourth switch mounted on the second opposing side wall for controlling the movement of the rear right vehicle window.

9. The apparatus of claim 7 wherein the switches are of the momentary pushbutton type.

10. The apparatus of claim 7 wherein the switches are of the momentary slide tape.

11. The apparatus of claim 8 wherein the switches are of the toggle type having a downwardly oriented position for moving the respective window downward and an upwardly oriented position for moving the respective window upward.

12. The apparatus of claim 8 wherein the switches are of the momentary slide type having a downwardly oriented position for moving the respective window downward and an upwardly oriented position for moving the respective window upward.

13. In combination with a motor vehicle seat having a motorized adjustable seat with movable cushion portion and a movable back rest portion that permits an automatic adjustment to a subjective position desired by the operator, a switch arrangement mounted on the seat comprising:

a base member configured to simulate the exterior configuration of the seat on a reduced scale having a substantially L shape with an elongated four-sided cushion portion having a horizontal portion with an upper and lower surface and also a forward and rearward side surface and an upper back portion with a front and back surface, the back portion positioned adjacent one end of the cushion portion and extending in one vertical direction substantially traverse to the elongated horizontal portion, the base member is integral with a side portion of the cushion portion of the seat; and switch means respectively positioned on the base member for driving the motorized seat, the switch means being juxtapositioned on the base member so that both the position and direction of activation of the switch means simulates a manual movement of the actual seat positions to the desired positions for the operator, including a first switch on one of the upper surface and lower surface for controlling movement of the seat downwardly;

a second switch on the other of the upper surface and the lower surface for controlling movement of the seat upwardly;

a third switch on one of the forward surface and rear surface for controlling movement of the seat rearwardly;

a fourth switch on the other of the forward surface and the rear surface for controlling movement of the seat forwardly;

a fifth switch on one of the front surface and back surface for controlling movement of the seat back backwardly; and a sixth switch on the other of the front surface and the back surface for controlling movement of the seat back frontwardly.

* * * * *